US008358658B2

(12) United States Patent
Flynn et al.

(10) Patent No.: US 8,358,658 B2
(45) Date of Patent: Jan. 22, 2013

(54) IMPLEMENTING ORDERED AND RELIABLE TRANSFER OF PACKETS WHILE SPRAYING PACKETS OVER MULTIPLE LINKS (75) Inventors: William Thomas Flynn, Rochester, MN (US); Phillip Rogers Hillier, III, Rochester, MN (US); David Alan Shedivy, Rochester, MN (US); Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 12/727,545

(22) Filed: Mar. 19, 2010

(65) Prior Publication Data

US 2011/0228783 A1 Sep. 22, 2011

(51) Int. Cl.
H04L 12/28 (2006.01)

(52) U.S. Cl. ........ 370/394; 370/385; 370/387; 370/389; 370/392

(58) Field of Classification Search ........... 370/385–394
See application file for complete search history.

(56) References Cited

U.S. PATENT DOCUMENTS

| | | | | | |
|---|---|---|---|---|---|
| 4,703,475 | A | * | 10/1987 | Dretzka et al. | 370/394 |
| 5,434,977 | A | * | 7/1995 | Zapisek | 709/238 |
| 6,246,684 | B1 | * | 6/2001 | Chapman et al. | 370/394 |
| 6,351,454 | B1 | * | 2/2002 | Crocker et al. | 370/235 |
| 6,574,230 | B1 | * | 6/2003 | Almulhem et al. | 370/412 |
| 6,662,254 | B1 | * | 12/2003 | Tal et al. | 710/300 |
| 6,697,359 | B1 | * | 2/2004 | George | 370/357 |
| 6,747,972 | B1 | * | 6/2004 | Lenoski et al. | 370/394 |
| 6,760,327 | B1 | * | 7/2004 | Manchester et al. | 370/364 |
| 6,788,686 | B1 | * | 9/2004 | Khotimsky et al. | 370/394 |
| 6,954,463 | B1 | * | 10/2005 | Ma et al. | 370/401 |
| 7,006,500 | B1 | * | 2/2006 | Pedersen et al. | 370/394 |
| 7,586,917 | B1 | * | 9/2009 | Ferguson et al. | 370/394 |
| 2003/0081600 | A1 | * | 5/2003 | Blaker et al. | 370/389 |
| 2003/0172181 | A1 | * | 9/2003 | Sharma | 709/238 |
| 2004/0062198 | A1 | * | 4/2004 | Pedersen et al. | 370/229 |
| 2004/0141521 | A1 | * | 7/2004 | George | 370/463 |
| 2005/0232269 | A1 | * | 10/2005 | Yao et al. | 370/389 |
| 2007/0110088 | A1 | * | 5/2007 | Kemp et al. | 370/419 |
| 2007/0206600 | A1 | * | 9/2007 | Klimker et al. | 370/394 |
| 2009/0059928 | A1 | * | 3/2009 | Enomoto et al. | 370/394 |
| 2009/0086735 | A1 | | 4/2009 | Tsang | |
| 2009/0112563 | A1 | * | 4/2009 | Drerup | 703/21 |
| 2009/0193372 | A1 | * | 7/2009 | Baumgartner et al. | 716/5 |
| 2010/0202460 | A1 | * | 8/2010 | Park et al. | 370/394 |
| 2010/0329275 | A1 | * | 12/2010 | Johnsen et al. | 370/412 |
| 2011/0013519 | A1 | * | 1/2011 | Chang et al. | 370/241 |

* cited by examiner

FOREIGN PATENT DOCUMENTS

EP 0282628 A2 9/1988

OTHER PUBLICATIONS

International Search Report and Written Opinion dated Sep. 2, 2011—international application PCT/EP2011/052431.

*Primary Examiner* — Ayaz Sheikh
*Assistant Examiner* — Andrew C Lee
(74) *Attorney, Agent, or Firm* — Joan Pennington (57) ABSTRACT A method and circuit for implementing ordered and reliable transfer of packets while spraying packets over multiple links, and a design structure on which the subject circuit resides are provided. Each source interconnect chip maintains a spray mask including multiple available links for each destination chip for spraying packets across multiple links of a local rack interconnect system. Each packet is assigned an End-to-End (ETE) sequence number in the source interconnect chip that represents the packet position in an ordered packet stream from the source device. The destination interconnect chip uses the ETE sequence numbers to reorder the received sprayed packets into the correct order before sending the packets to the destination device.

20 Claims, 10 Drawing Sheets

IMPLEMENTING ORDERED AND RELIABLE TRANSFER OF PACKETS WHILE SPRAYING PACKETS OVER MULTIPLE LINKS

FIELD OF THE INVENTION

The present invention relates generally to the data processing field, and more particularly, relates to a method and circuit for implementing ordered and reliable transfer of packets while spraying packets over multiple links in a local rack interconnect system, and a design structure on which the subject circuit resides.

DESCRIPTION OF THE RELATED ART

It is desirable to replace multiple interconnects, such as Ethernet, Peripheral Component Interconnect Express (PCIe), and Fibre channel, within a data center by providing one local rack interconnect system. The local rack interconnect system is used to transfer packets from a source high bandwidth device, such as either a central processor unit (CPU) or an input/output (I/O) adapter, to a destination high bandwidth device, for example, either a CPU or I/O adapter, using one or more hops across lower bandwidth links in the interconnect system.

The local rack interconnect system must be able to sustain the high bandwidth of the source and destination devices while maintaining reliable and ordered packet transmission to the destination device. All this must be done with low latency.

A need exists for an effective method and circuit to implement ordered and reliable transfer of packets while spraying packets over multiple links in a local rack interconnect system. It is desirable to provide such method and circuit that effectively and efficiently maintains the high bandwidth of the source and destination devices.

SUMMARY OF THE INVENTION

Principal aspects of the present invention are to provide a method and circuit for implementing ordered and reliable transfer of packets while spraying over multiple links, and a design structure on which the subject circuit resides. Other important aspects of the present invention are to provide such method, circuitry, and design structure substantially without negative effect and that overcome many of the disadvantages of prior art arrangements.

In brief, a method and circuit for implementing ordered and reliable transfer of packets while spraying packets over multiple links, and a design structure on which the subject circuit resides are provided. Each source interconnect chip maintains a spray mask including multiple available links for each destination chip for spraying packets across multiple links of a local rack interconnect system. Each packet is assigned an End-to-End (ETE) sequence number in the source interconnect chip that represents the packet position in an ordered packet stream from the source device. The destination interconnect chip uses the ETE sequence numbers to reorder the received sprayed packets into the correct order before sending the packets to the destination device.

In accordance with features of the invention, the destination interconnect chip returns an ETE acknowledge to the source interconnect chip when the corresponding packet has been delivered to the destination device. If the source interconnect chip does not receive the ETE acknowledge within a predefined timeout period or if a broken link is identified, the source chip resends the packet maintaining reliable transfer of packets.

In accordance with features of the invention, the spray mask includes some links providing a direct connection between the source chip and the destination chip. Some links cause the packet to be sent to one or more intermediate interconnect chips before reaching the destination chip.

In accordance with features of the invention, two separate physical switches are implemented in the interconnect chip to help reduce the overall latency of the packet transmission. One switch is a store and forward switch that handles moving the packet to and from the high bandwidth device interface from and to the low bandwidth link interface. A second switch that is a cut through switch that handles moving all packets from an incoming link to an outgoing link on an intermediate interconnect chip.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing ordered and reliable transfer of packets while spraying packets over multiple links in a multiple-path local rack interconnect system.

Figure 1A:
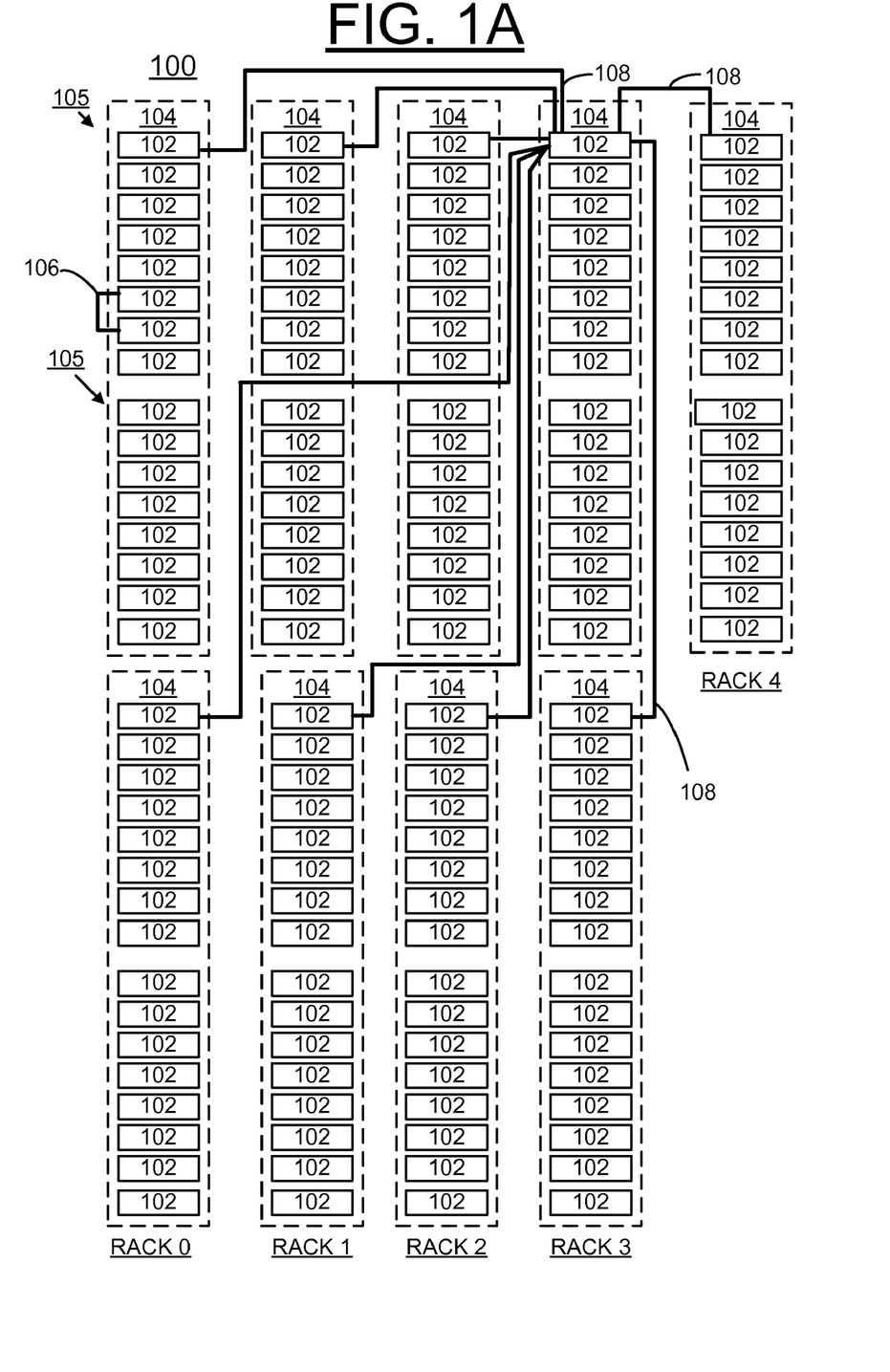
FIGS. 1A, 1B, 1C, 1D, and 1E are respective schematic and block diagrams illustrating an exemplary a local rack interconnect system for implementing ordered and reliable transfer of packets while spraying packets over multiple links in accordance with the preferred embodiment.

Having reference now to the drawings, in FIG. 1A, there is shown an example multiple-path local rack interconnect system generally designated by the reference character 100 used for implementing enhanced ordered and reliable transfer of packets while spraying packets over multiple links in accordance with the preferred embodiment. The multiple-path local rack interconnect system 100 supports computer system communications between multiple servers, and enables an Input/Output (TO) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fifth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (×2) high-speed serial (HSS) link.

Figure 1B:
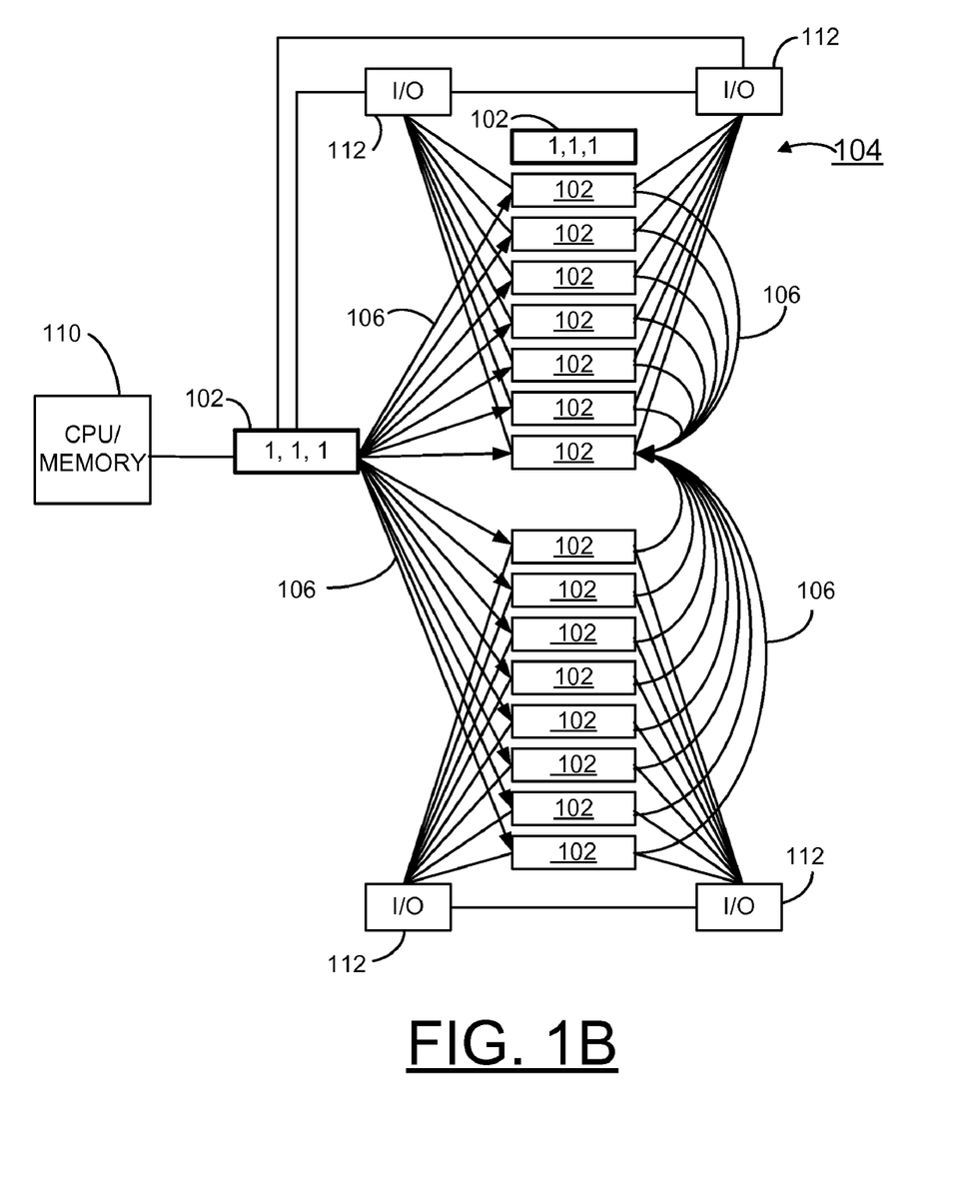
Figure 1C:
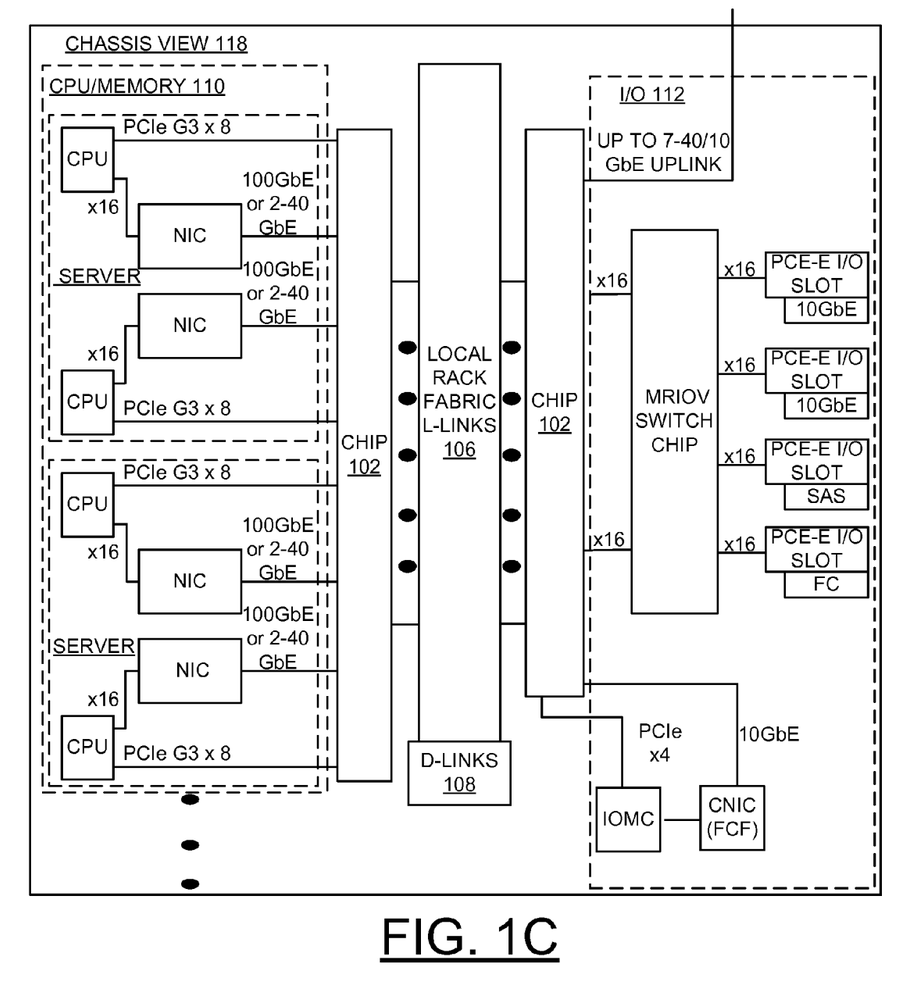
Figure 1D:
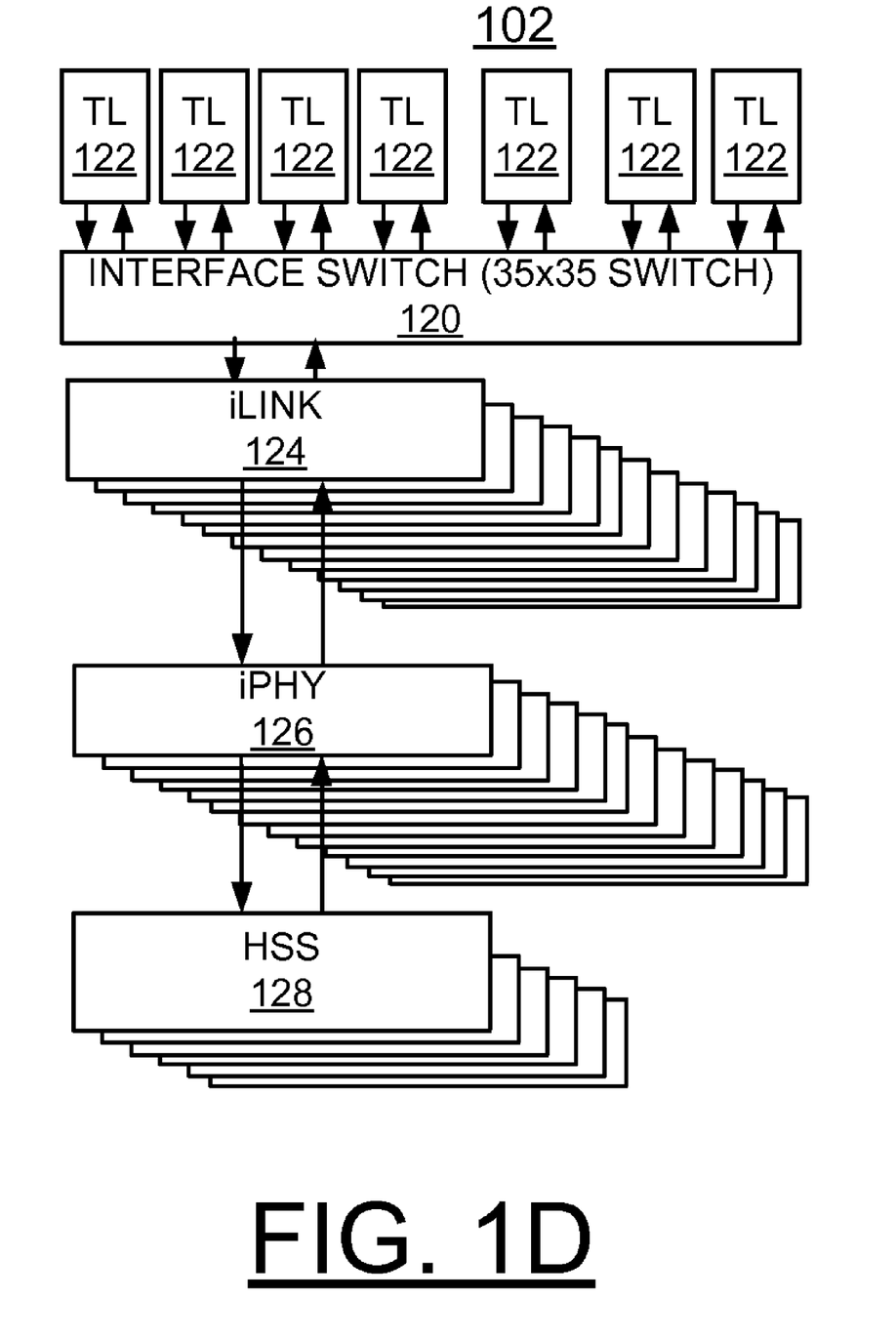
Figure 1E:
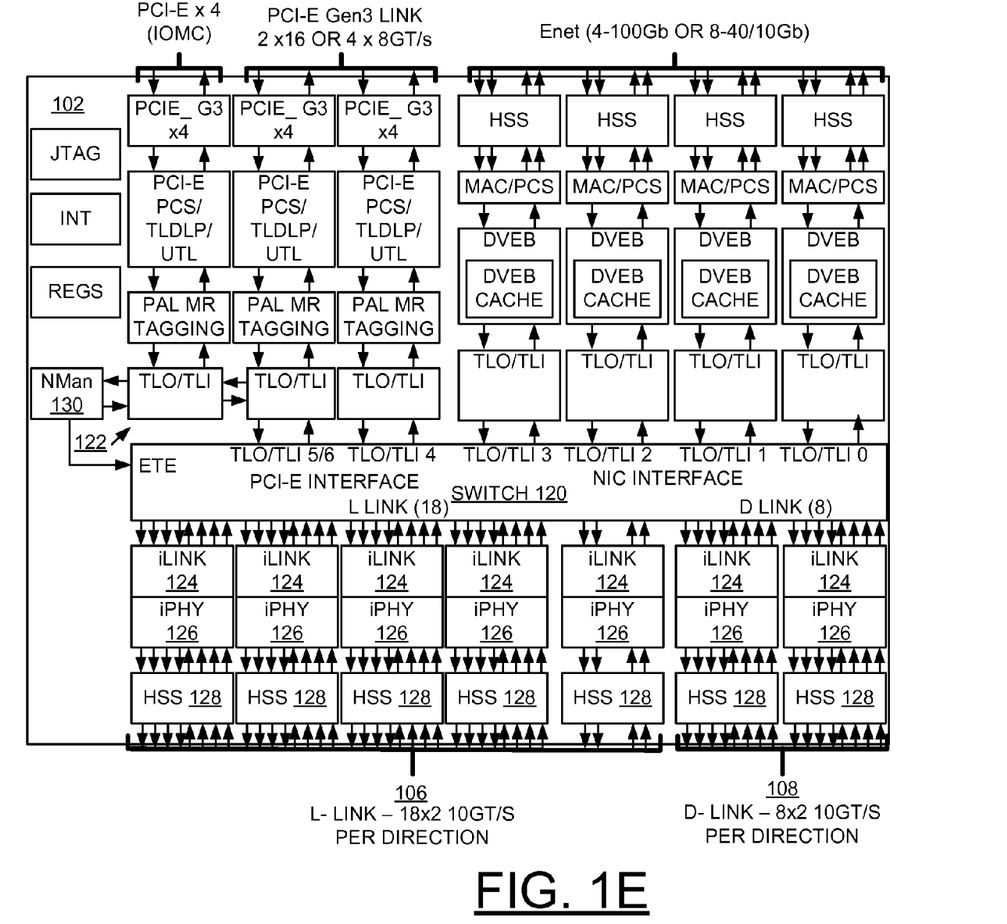

Referring also to FIG. 1E, each of the interconnect chips 102 of FIG. 1A includes, for example, 18 L-links 106, labeled 18×2 10 GT/S PER DIRECTION and 8 D-links 108, labeled 8×2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local I/O 112 may also use a particular L-link 106 of destination I/O. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, either the L-link 106 or D-link 108 at the beginning of the path is removed from a spray list at the source interconnect chip 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3×8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3×16 to an external MRIOV switch chip, with four×16 to PCI-E I/O Slots with two Ethernet slots indicated 10 GbE, and two storage slots indicated as SAS (serial attached SCSI) and FC (fibre channel), a PCIe×4 to a IOMC and 10 GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink 124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are sprayed onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7×8 full duplex cores providing the illustrated 26×2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E×4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3×4, and PCIE_G3 2×8, PCIE_G3 2×8, a Peripheral Component Interconnect Express (PCIe) Physical Coding Sub-layer (PCS) Transaction Layer/Data/Link Protocol (TLDLP) Upper Transaction Layer (UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, a method and circuit for implementing ordered and reliable transfer of packets while spraying packets over multiple links, and a design structure on which the subject circuit resides are provided. Packets are received from a source high bandwidth device, such as either a central processor unit (CPU) or an input/output (I/O) adapter, by a source interconnect chip 102 to be sent across the interconnect system 100 to a destination high bandwidth device, either CPU or I/O adapter, by a destination interconnect chip 102. To sustain the high bandwidth of the source and destination devices, packets are sprayed across multiple L links 106, or multiple L links 106 and D links 108 of the multiple-path local rack interconnect system 100. Some of the multiple L links 106, or multiple L links 106 and D links 108 provide a direct connection between the source interconnect chip 102 and the destination interconnect chip 102. Some of the multiple L links 106 or multiple L links 106 and D links 108 cause the packet to be sent to one or more intermediate interconnect chips 102 before reaching the destination interconnect chip 102.

In accordance with features of the invention, each source interconnect chip 102 maintains a spray mask including multiple available links for each destination chip 102 for spraying packets across multiple links in the multiple-path local rack interconnect system 100. To maintain the order of packets between the source device and the destination device, each packet is assigned an End-to-End (ETE) sequence number in the source interconnect chip that represents the packet position in the ordered packet stream from the source device. The destination interconnect chip 102 uses the ETE sequence number to reorder the received sprayed packets into the correct order before sending the packets to the destination device. To maintain the reliable transfer of packets, the destination interconnect chip 102 returns an ETE acknowledge to the source interconnect chip 102 when the corresponding packet has been delivered to the destination device. If the source interconnect chip 102 does not receive the ETE acknowledge within a timeout period, the source interconnect chip 102 resends the packet.

Figure 2:
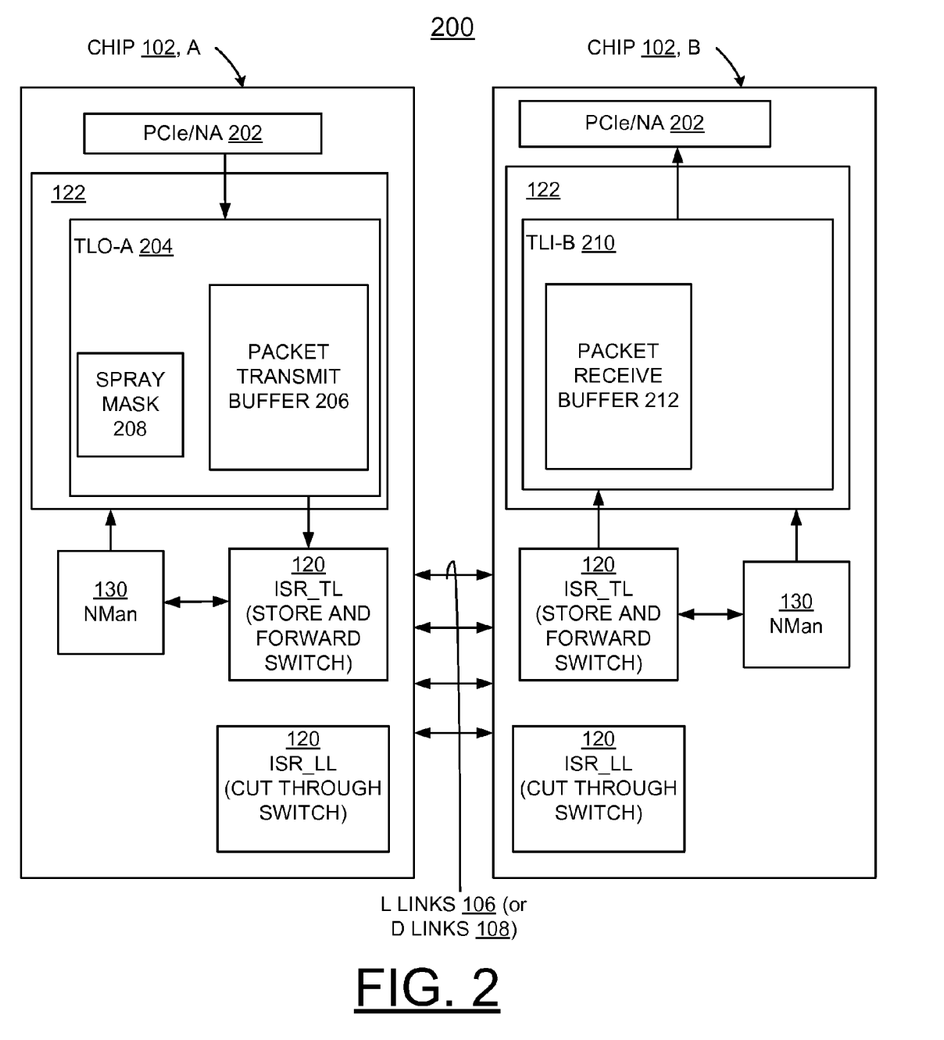
FIG. 2 is a schematic and block diagram illustrating a circuit for implementing ordered and reliable transfer of packets while spraying over multiple links in accordance with the preferred embodiment.

Referring now to FIG. 2, there is shown a circuit generally designated by the reference character 200 for implementing ordered and reliable transfer of packets while spraying packets over multiple links in accordance with the preferred embodiment. Circuit 200 and each interconnect chip 102 includes a respective Peripheral Component Interconnect Express (PCIe)/Network Adapter (NA) 202 or PCIe/NA 202, as shown included in an illustrated pair of interconnect chips 102 of a source interconnect chip 102, A and a destination interconnect chip 102, B. Circuit 200 and each interconnect chip 102 includes a transport layer 122 including a respective transport layer out (TLO)-A 204, and a respective transport layer in (TLI)-B, 210 as shown in FIG. 2.

TLO 204 includes a packet transmit buffer 206 for storing packets received from the high bandwidth PCIe/NA 202, and a spray mask 208 or spray vector 208 received from a network manager (NMan) 130 in accordance with the preferred embodiment. The network manager (NMan) 130 uses End-to-End (ETE) heartbeats for identifying available links by sending ETE heartbeats across local links 106, 108 in the interconnect system 100. For example, each interconnect chip 102 maintains the spray mask 208 including every other interconnect chip in the interconnect system 100 by sending End-to-End (ETE) heartbeats across all local L-links 106 and D-links 108 to all destination interconnect chips 102. When a first interconnect chip 102 is receiving good heartbeats from another interconnect chip 102 on one of its links, the first interconnect chip 102 sets the corresponding link bit in the spray mask 208 of that other interconnect chip 102.

In accordance with features of the invention, to help reduce the overall latency of the packet transmission, two separate physical switches are implemented in the switch 120 of each interconnect chip 102. One switch ISR_TL of switch 120 is a store and forward switch that handles moving the packet to/from the high bandwidth device interface from/to the low bandwidth link interface. A second switch ISR_LL of switch 120 is a cut through switch that handles moving all packets from an incoming link to an outgoing link on an intermediate interconnect chip.

Circuit 200 includes a store and forward switch ISR_TL of the interface switch 120 connecting a plurality of transport layers (TL) 122, such as 7 TLs, and interface links (iLink) layer 124 or 26 iLinks and a cut through switch ISR_LL of the interface switch 120 connecting, for example, L links (18) and D links (8) interface links (iLink) layer 124 or 26 iLinks of each interconnect chip 102 including the source interconnect chip 102, A and the destination interconnect chip 102, B. The store and forward switch ISR_TL of the interface switch 120 handles moving packets to and from the high bandwidth device interface from and to the low bandwidth link interface. The cut through switch ISR_LL of the interface switch 120 receives a packet from an L link 106 or D link 108 and sends the packet on another L link 106.

Circuit 200 and each interconnect chip 102 includes a transport layer 122 including a respective transport layer in (TLI)-B, 210, as shown in FIG. 2. Each TLI 210 includes a packet receive buffer 212 providing packet buffering and a network manager (NMan) 130.

In accordance with features of the invention, the TLI-B 210 of the destination transport layer 122 buffers the received sprayed packets, for example, in the packet receive buffer 212, and uses the ETE Sequence Number to reorder the received sprayed packets into the correct order before sending packets to the destination device.

Figure 3:
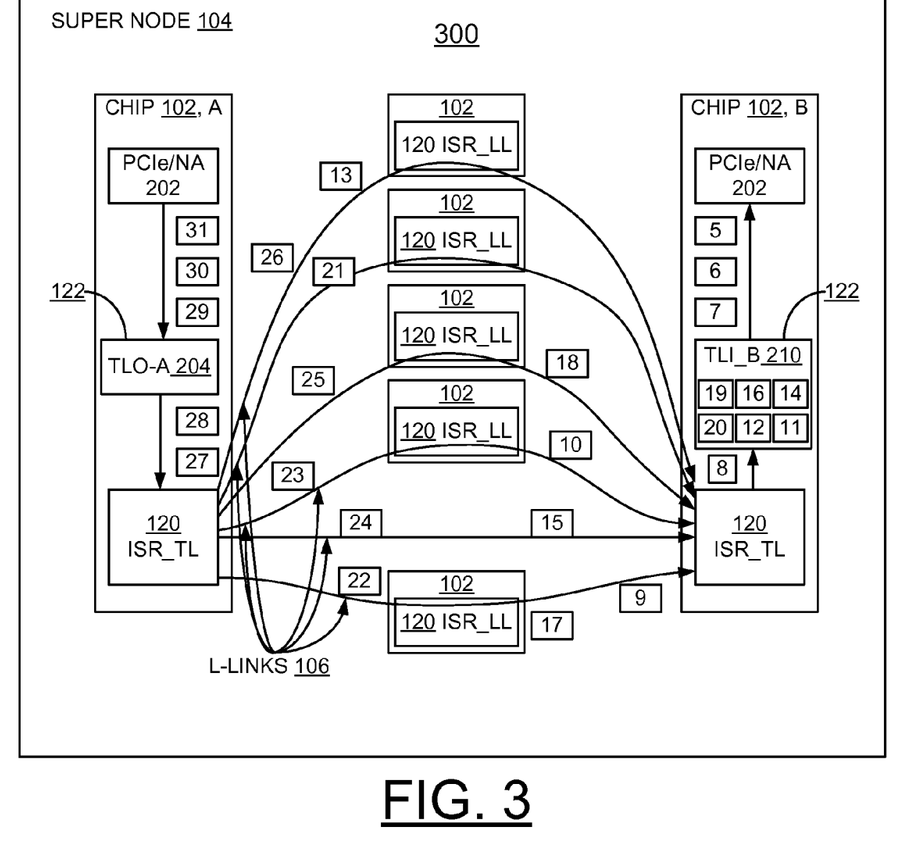
FIGS. 3, 4, and 5 are charts illustrating exemplary operations performed by the circuit of FIG. 2 for implementing ordered and reliable transfer of packets while spraying packets over multiple links in accordance with the preferred embodiment.

Referring now to FIG. 3, there are shown exemplary operations generally designated by the reference character 300 performed by the circuit 200 for implementing ordered and reliable transfer of packets while spraying over multiple links in accordance with the preferred embodiment. Spraying operations 300 illustrate packet spraying over multiple L links 106 within a single super node 104. NMan sends the spray mask 208 to the TLO-A, 204 providing paths that are available for each destination interconnect chip 102, identified by chip ID, and the TLO-A, 204 uses the spray mask 208 to tell the ISR_TL switch 120 which ports it can use to spray packets. Paths are identified, for example by an exit port at the source interconnect chip 102.

To maintain the order of packets between the source device and the destination device, each packet is assigned an End-to-End (ETE) sequence number in the source interconnect chip 102, A, as indicated by a respective number representing packet order number in the multiple packets being transferred from a source chip 102, A to a destination chip 102, B. Packets labeled 29, 30, 31 represent an in-order packets in a packet stream received from the PCIe/NA 202 by the transport layer out (TLO)-A 204 of the transport layer 122. Packets labeled 27, 28 represent in-order packets sent from the TLO-A, 204 to the store and forward ISR_TL switch 120.

Multiple L links 106 extend between the source chip 102, A, and a plurality of intermediate chips 102, which are connected by a respective cut through ISR_LL switch 120 to multiple L links 106 extending between the intermediate chips 102 and the destination chip 102, B in the super node 104. Packets labeled 13, 26, 21, 25, 23, 24, 22, 18, 10, 15, 17, and 9 are illustrated as being transferred or spraying over multiple L links 106. Individual packets stay whole and follow a single path; and different packets follow different paths. At the destination chip, in-order packets 5, 6, and 7 are shown being sent from the TLI-B, 210 to the PCIe/NA 202. As shown, the TLI-B, 210 is buffering out-of-order packets 19, 16, 14, 20, 12, and 11 until the ordered packet stream can be reconstructed, and then transferred to the PCIe/NA 202. Packet 8 is being transferred from the store and forward ISR_TL switch 120 to the TLI-B, 210, as shown in FIG. 3.

Figure 4:
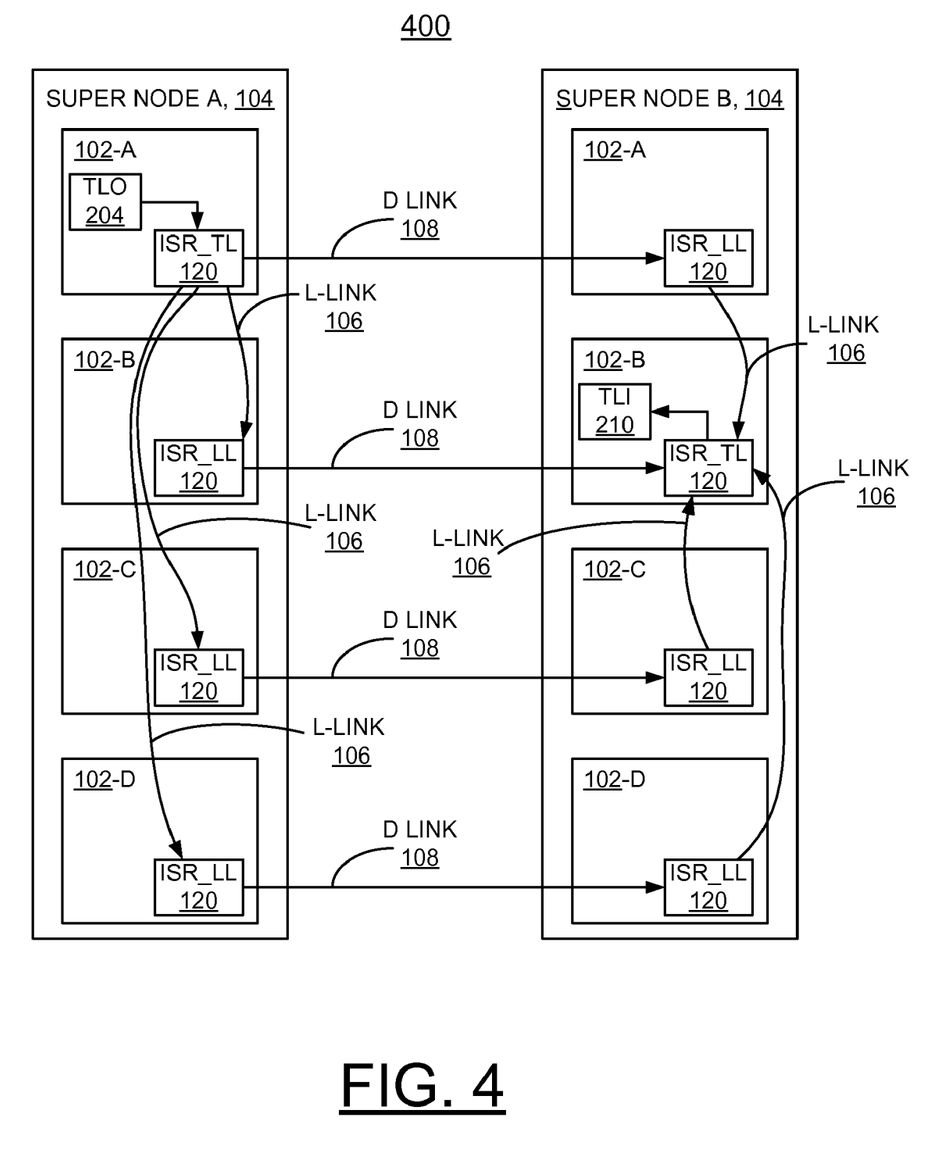

Referring now to FIG. 4, there are shown exemplary operations generally designated by the reference character 400 performed by the circuit 200 for implementing ordered and reliable transfer of packets while spraying over multiple links in accordance with the preferred embodiment. Spraying operations 400 illustrate packet spraying paths for packet spraying over multiple D links 108 between respective interconnect chips 102, A, B, C, and D of a pair of super nodes A and B, 104 and over multiple L links 106 between respective interconnect chips 102, A, B, C, and D within the respective super nodes A and B, 104.

As illustrated in FIG. 4, the interconnect chip 102, A is the source interconnect chip 102 with TLO 204 connected to the ISR_TL switch 120 in the super node A, 104. The interconnect chip 102, B is the destination interconnect chip 102, B with TLI 210 connected to the ISR_TL switch 120 in the super node B, 104. The other interconnect chips 102, B, C, D in super node A, 104 and interconnect chips 102, A, C, D in super node B, 104 are intermediate interconnect chips 102 with the cut through ISR_LL switch 120 moving packets from respective L links 106 and D links 108.

Figure 5:
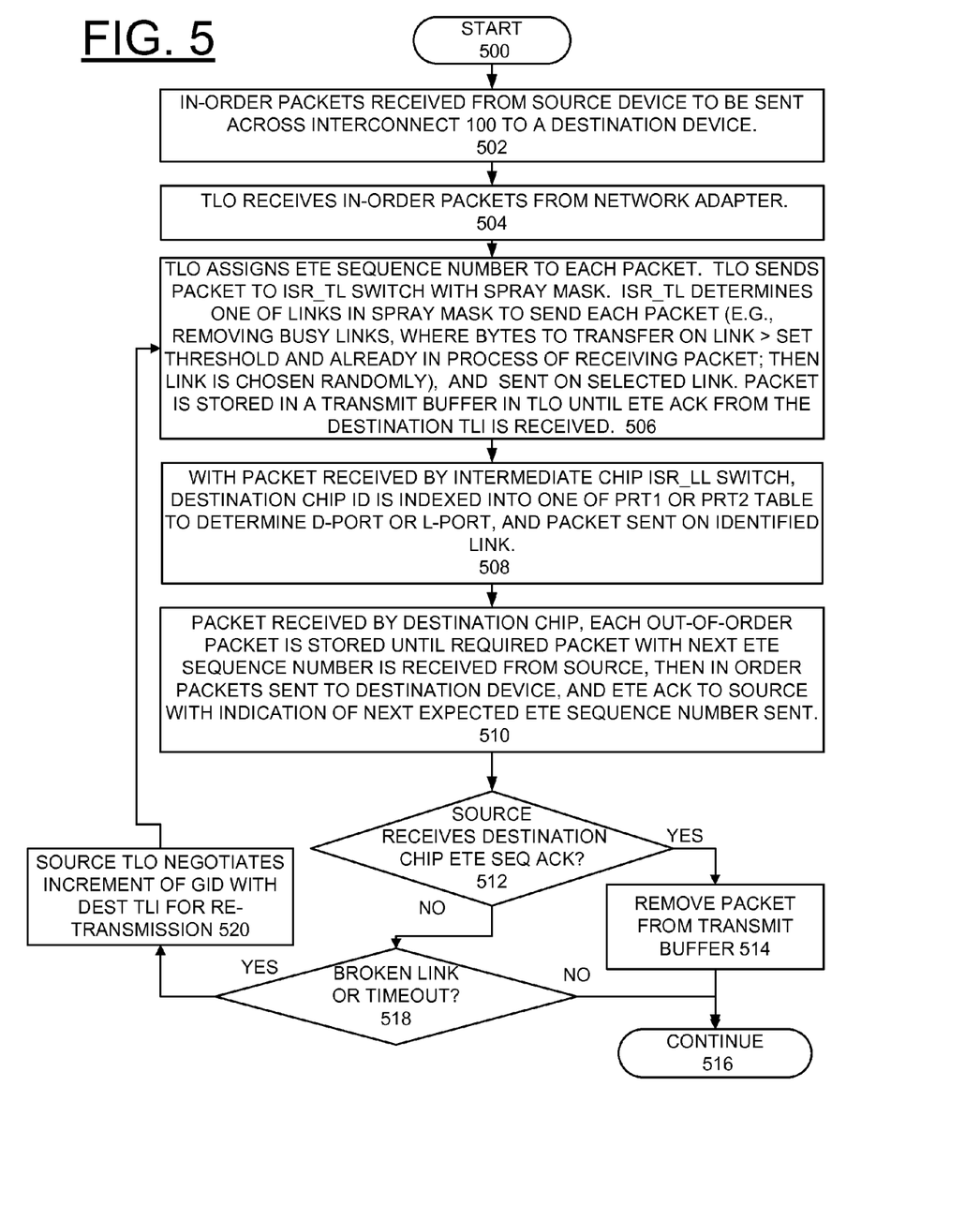

Referring now to FIG. 5, there are shown exemplary operations performed by the circuit 200 for implementing ordered and reliable transfer of packets while spraying packets over multiple links in accordance with the preferred embodiment starting at a block 400. Packets are received from a source device to be sent across multiple paths in the multiple-path local rack interconnect system 100 to a destination device as indicated at a block 502. The received packets from the source device are in-order. The TLO 204 of the source interconnect chip 102 receives the in-order packets from the PCIe/NA 202 as indicated at a block 504.

As indicated at a block 506, the TLO 204 assigns an End-to-End (ETE) sequence number to each packet and sends each packet with the spray mask to the ISR_TL switch 120. The ISR_TL switch 120 determines the link to send the packet. The spray mask 208 is used by the ISR_TL switch 120 on the source interconnect chip 102 to determine which one of the links in the spray mask to use to send the packet. The first step in choosing a link is to remove any links from the spray mask 208 that are busy. The ISR_TL switch 120 indicates that a particular link is busy when the number of bytes to transfer on the link is above a programmable threshold. The next step is to remove any link from the spray mask 208 that is already in the process of receiving a packet from the switch partition 120 that originated from a different source device. From the remaining links in the spray mask 208, a link is randomly chosen by the ISR_TL switch 120 to allow for a generally uniform distribution of packets across all eligible links. The ISR_TL switch 120 sends each packet on the selected link. The TLO 204 of the source interconnect chip 102 assigns the ETE sequence number to each packet in sequential order based upon the destination device. This means that each source interconnect chip 102 keeps track of the next ETE sequence number to use for each combination of source device and destination device. The source interconnect chip 102 stores the packet in a retry transmit buffer in the TLO 204 until an ETE sequence number acknowledge is received from the destination TLI-B, 210 indicating that the packet has been sent to the destination device.

As indicated at a block 508, with a packet received by an intermediate chip 102, the cut through switch ISR_LL handles switching such packets that are received from a link and are sent out on another link. The intermediate chip 102 uses the destination chip identification that is indexed into one of a pair of port tables PRT1 or PRT2 to identify a particular D-port or L-port, and the packet is sent on the identified link.

As indicated at a block 510, when the packet is received by the destination chip 102, each out-of-order packet is buffered, and when the packet with the next required ETE sequence number is received, then the buffered packets are transferred in the correct order to the destination device, sending the ETE sequence number acknowledge to the source interconnect chip 102. The destination interconnect chip 102 provides this notification by returning the ETE sequence number acknowledge to the source interconnect chip 102 with an indication of the next expected ETE sequence number that the destination interconnect chip 102 is expecting to receive.

As indicated at a decision block 512, the source interconnect chip 102 checks for the ETE sequence number acknowledge from the destination chip. When the ETE sequence number acknowledge is received from the destination chip the source interconnect chip 102 then removes any packets from its retry buffer that have an ETE sequence number that is less than the received next expected ETE sequence number as indicated at a block 514. Then sequential operations continue as indicated at a block 516.

When either a broken link is indicated by missing heartbeats or a timeout for ETE sequence number acknowledge from the destination chip is identified as indicated at a decision block 518, then the source TLO negotiates an increment of a generation identification (GID) with the TLI of the destination interconnect chip 102 for packet retransmission as indicated at a block 520. Then the operations continue at block 506 for resending the packet with the assigned End-to-End (ETE) sequence number and incremented GID. Otherwise the sequential operations continue at block 516.

Figure 6:
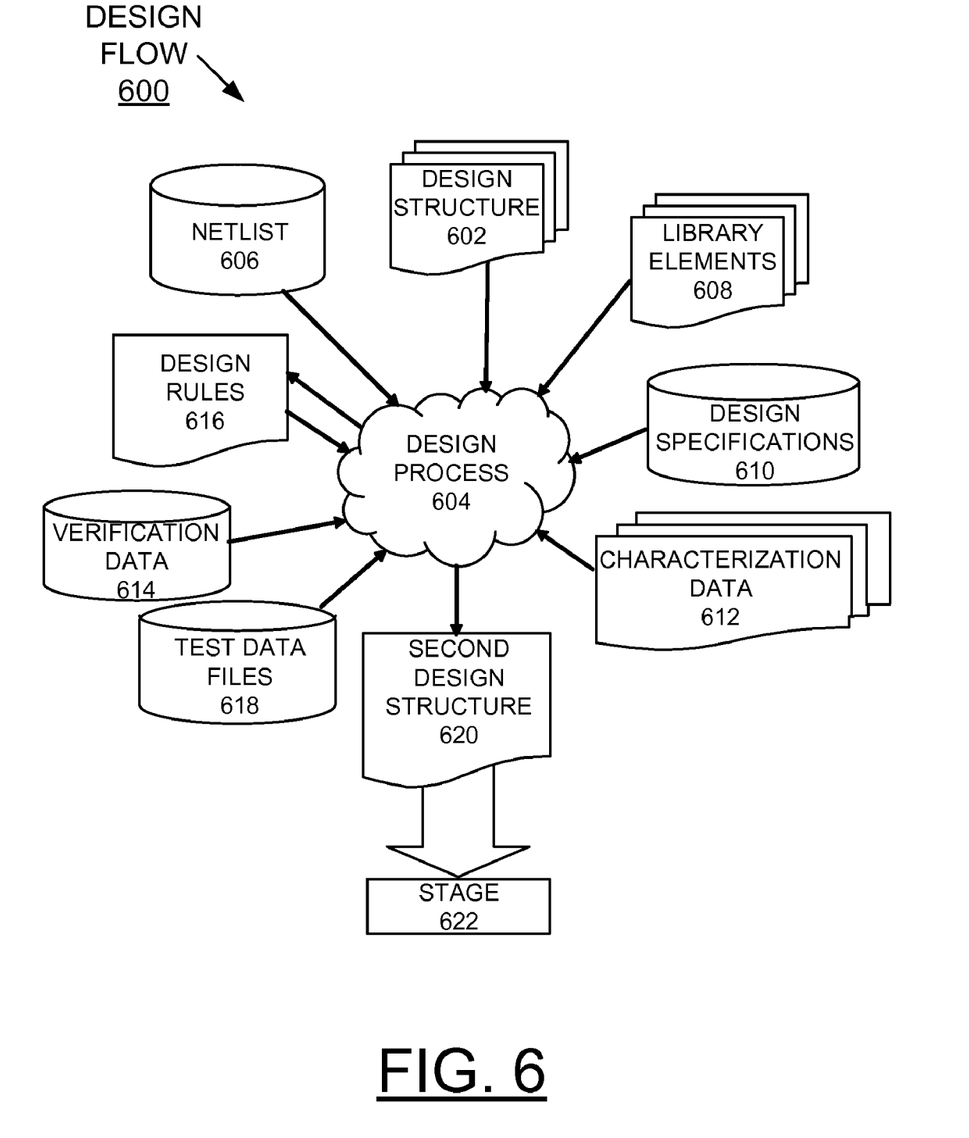
FIG. 6 is a flow diagram of a design process used in semiconductor design, manufacturing, and/or test.

FIG. 6 shows a block diagram of an example design flow 600 that may be used for circuit 200 and the interconnect chip 102 described herein. Design flow 600 may vary depending on the type of IC being designed. For example, a design flow 600 for building an application specific IC (ASIC) may differ from a design flow 600 for designing a standard component. Design structure 602 is preferably an input to a design process 604 and may come from an IP provider, a core developer, or other design company or may be generated by the operator of the design flow, or from other sources. Design structure 602 comprises circuits 102, 200 in the form of schematics or HDL, a hardware-description language, for example, Verilog, VHDL, C, and the like. Design structure 602 may be contained on one or more machine readable medium. For example, design structure 602 may be a text file or a graphical representation of circuits 102, 200. Design process 604 preferably synthesizes, or translates, circuits 102, 200 into a netlist 606, where netlist 606 is, for example, a list of wires, transistors, logic gates, control circuits, I/O, models, etc. that describes the connections to other elements and circuits in an integrated circuit design and recorded on at least one of machine readable medium. This may be an iterative process in which netlist 606 is resynthesized one or more times depending on design specifications and parameters for the circuits.

Design process 604 may include using a variety of inputs; for example, inputs from library elements 608 which may house a set of commonly used elements, circuits, and devices, including models, layouts, and symbolic representations, for a given manufacturing technology, such as different technology nodes, 32 nm, 45 nm, 90 nm, and the like, design specifications 610, characterization data 612, verification data 614, design rules 616, and test data files 618, which may include test patterns and other testing information. Design process 604 may further include, for example, standard circuit design processes such as timing analysis, verification, design rule checking, place and route operations, and the like. One of ordinary skill in the art of integrated circuit design can appreciate the extent of possible electronic design automation tools and applications used in design process 604 without deviating from the scope and spirit of the invention. The design structure of the invention is not limited to any specific design flow.

Design process 604 preferably translates an embodiment of the invention as shown in FIGS. 1A-1E, 2, 3, 4, and 5 along with any additional integrated circuit design or data (if applicable), into a second design structure 620. Design structure 620 resides on a storage medium in a data format used for the exchange of layout data of integrated circuits, for example, information stored in a GDSII (GDS2), GL1, OASIS, or any other suitable format for storing such design structures. Design structure 620 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, 2, 3, 4, and 5. Design structure 620 may then proceed to a stage 622 where, for example, design structure 620 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing ordered and reliable transfer of packets while spraying packets over multiple links in an interconnect system, said method comprising:
    providing a source interconnect chip coupled to the source device and providing a destination interconnect chip coupled to the destination device;
    maintaining a spray mask of available links to each destination interconnect chip and identifying multiple available links to transfer packets from a source device to a destination device;
    removing busy links from said spray mask, and randomly selecting a link from said spray mask for sending each packet;
    assigning each packet an End-to-End (ETE) sequence number to represent a packet position in an ordered packet stream from the source device and sending each packet on the selected link; and
    using the ETE sequence number to reorder the received sprayed packets into the ordered packet stream before sending the packets to the destination device.

2. The method as recited in claim 1 wherein using the ETE sequence number to reorder the received sprayed packets includes buffering packets until the received sprayed packets are reordered into the ordered packet stream.

3. The method as recited in claim 1 wherein using the ETE sequence number to reorder the received sprayed packets includes said destination interconnect chip sending an ETE sequence number acknowledge to said source interconnect chip.

4. The method as recited in claim 1 wherein maintaining a spray mask includes sending ETE heartbeats across local links in the interconnect system, and using the ETE heartbeats for identifying available links.

5. The method as recited in claim 1 includes said source chip resending a packet responsive to a predefined timeout without receiving a respective ETE sequence number acknowledge from destination interconnect chip.

6. The method as recited in claim 1 includes said source chip removing a buffered packet responsive to receiving an ETE sequence number acknowledge from destination interconnect chip.

7. The method as recited in claim 1 includes said source chip incrementing a generation identification (GID) and resending a packet with the assigned End-to-End (ETE) sequence number and the incremented GID.

8. The method as recited in claim 1 includes said source chip storing each sent packet until an ETE sequence number acknowledge from destination interconnect chip is received.

9. A circuit for implementing ordered and reliable transfer of packets while spraying packets over multiple links in an interconnect system, said circuit comprising:
    a plurality of interconnect chips including a source interconnect chip coupled to a source device and a destination interconnect chip coupled to the destination device;
    each of said plurality of interconnect chips include a store and forward switch and a cut through switch,
    a plurality of links connected between said source interconnect chip and said destination interconnect chip; said cut through switch receiving a packet from one said link and sending the packet on another said link;
    said source interconnect chip identifying multiple available links to transfer packets from the source device to the destination device;

said source interconnect chip, assigning each packet an End-to-End (ETE) sequence number to represent a packet position in an ordered packet stream from the source device and sending each packet on a selected link;

said destination interconnect chip using the ETE sequence number to reorder the received sprayed packets into the ordered packet stream and sending the ordered packets to the destination device.

10. The circuit as recited in claim 9 wherein said destination interconnect chip buffers received sprayed packets until the received sprayed packets are reordered into the ordered packet stream.

11. The circuit as recited in claim 9 wherein said destination interconnect chip sends an ETE sequence number acknowledge to said source interconnect chip.

12. The circuit as recited in claim 9 wherein said source interconnect chip storing each sent packet until a respective ETE sequence number acknowledge from destination interconnect chip is received.

13. The circuit as recited in claim 9 wherein said source interconnect chip resends a packet responsive to a predefined timeout occurring without receiving an ETE sequence number acknowledge from destination interconnect chip.

14. The circuit as recited in claim 9 wherein said source interconnect chip maintains a spray mask of available links to each destination interconnect chip.

15. A multiple-path local rack interconnect system for implementing ordered and reliable transfer of packets while spraying packets over multiple links comprising:
  a plurality of interconnect chips including a source interconnect chip coupled to a source device and a destination interconnect chip coupled to the destination device; each of said plurality of interconnect chips include a store and forward switch and a cut through switch,
  a plurality of serial links connected between each of said plurality of interconnect chips; said cut through switch receiving a packet from one said link and sending the packet on another said link;
  said source interconnect chip maintaining a spray mask of available links to each destination interconnect chip and identifying multiple available links to transfer packets from the source device to the destination device;
  said source interconnect chip removing busy links from said spray mask, and randomly selecting one said link from said spray mask for sending each packet;
  said source interconnect chip, assigning each packet an End-to-End (ETE) sequence number to represent a packet position in an ordered packet stream from the source device and sending each packet on a selected link;
  said destination interconnect chip using the ETE Sequence Number to reorder the received sprayed packets into the ordered packet stream before sending the packets to the destination device.

16. The multiple-path local rack interconnect system as recited in claim 15 wherein said destination interconnect chip sends an ETE sequence number acknowledge to said source interconnect chip; and said source interconnect chip resends a packet responsive to a predefined timeout without receiving an ETE sequence number acknowledge from destination interconnect chip.

17. A design structure embodied in a non-transitory machine readable medium used in a design process, the design structure read and used in a manufacture of a semiconductor chip produces a chip, the design structure comprising:
  a circuit tangibly embodied in the non-transitory machine readable medium used in the design process, said circuit for implementing ordered and reliable transfer of packets while spraying packets over multiple links in an interconnect system, said circuit comprising:
  a plurality of interconnect chips including a source interconnect chip coupled to a source device and a destination interconnect chip coupled to the destination device; each of said plurality of interconnect chips include a store and forward switch and a cut through switch,
  a plurality of links connected between said source interconnect chip and said destination interconnect chip; said cut through switch receiving a packet from one said link and sending the packet on another said link;
  said source interconnect chip identifying multiple available links to transfer packets from the source device to the destination device;
  said source interconnect chip, assigning each packet an End-to-End (ETE) sequence number to represent a packet position in an ordered packet stream from the source device and sending each packet on a selected link;
  said destination interconnect chip using the ETE Sequence Number to reorder the received sprayed packets into the ordered packet stream before sending the packets to the destination device, and sending an ETE sequence number acknowledge to said source interconnect chip; and
  said source interconnect chip resending a packet responsive to a predefined timeout without receiving an ETE sequence number acknowledge from destination interconnect chip, wherein the design structure, when read and used in the manufacture of the semiconductor chip produces the chip comprising said circuit.

18. The design structure of claim 17, wherein the design structure comprises a netlist, which describes said circuit.

19. The design structure of claim 17, wherein the design structure resides on storage medium as a data format used for the exchange of layout data of integrated circuits.

20. The design structure of claim 17, wherein the design structure includes at least one of test data files, characterization data, verification data, or design specifications.

* * * * *